(12) United States Patent
Lin

(10) Patent No.: US 7,997,805 B1
(45) Date of Patent: Aug. 16, 2011

(54) OPTICAL FIBER CONNECTOR ASSEMBLY

(75) Inventor: I-Thun Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/823,135

(22) Filed: Jun. 25, 2010

(30) Foreign Application Priority Data

Apr. 20, 2010 (TW) .................................. 099112259

(51) Int. Cl.
*G02B 6/38* (2006.01)

(52) U.S. Cl. ......................................................... 385/75

(58) Field of Classification Search .................. None
See application file for complete search history.

(56) References Cited

U.S. PATENT DOCUMENTS

| 4,276,113 | A | * | 6/1981 | Carlsen et al. | 156/502 |
| 4,678,264 | A | * | 7/1987 | Bowen et al. | 385/89 |
| 4,784,456 | A | * | 11/1988 | Smith | 385/55 |
| 4,840,451 | A | * | 6/1989 | Sampson et al. | 385/89 |
| 5,212,754 | A | * | 5/1993 | Basavanhally et al. | 385/90 |
| 6,823,109 | B2 | * | 11/2004 | Sasaki et al. | 385/34 |
| 6,860,648 | B2 | * | 3/2005 | Jin et al. | 385/89 |

* cited by examiner

*Primary Examiner* — Sung Pak

(74) *Attorney, Agent, or Firm* — Raymond J. Chew

(57) ABSTRACT

An optical fiber connector assembly includes optical fibers, a first connector, electric wires, and a second connector. The first connector receives the optical fibers. The second connector includes a coupling portion and a conversion portion. The coupling portion is mechanically engaged with the first connector and includes lenses optically coupled to the respective optical fibers. The conversion portion receives the electric wires and includes light detectors electrically connected to the corresponding electric wires and configured for receiving and converting optical signals into electrical signals.

12 Claims, 4 Drawing Sheets

OPTICAL FIBER CONNECTOR ASSEMBLY

BACKGROUND

1. Technical Field

The present disclosure relates to an optical fiber connector assembly.

2. Description of Related Art

An optical fiber connector assembly typically includes optical fibers and two optical fiber connector connectors, such as a male connector and a female connector, for coupling the optical fibers together to allow optical transmittance between the optical fibers. The connectors include lenses each being aligned with a corresponding optical fiber. When coupling connectors together, a lens in the male connector has to be precisely aligned with a corresponding lens in the female connector to ensure optical transmittance. However, the alignment of lenses is generally difficult to achieve, which may result in poor optical transmittance.

Therefore, an optical fiber connector assembly, which can overcome the above-mentioned problems, is needed.

DETAILED DESCRIPTION

Figure 1:
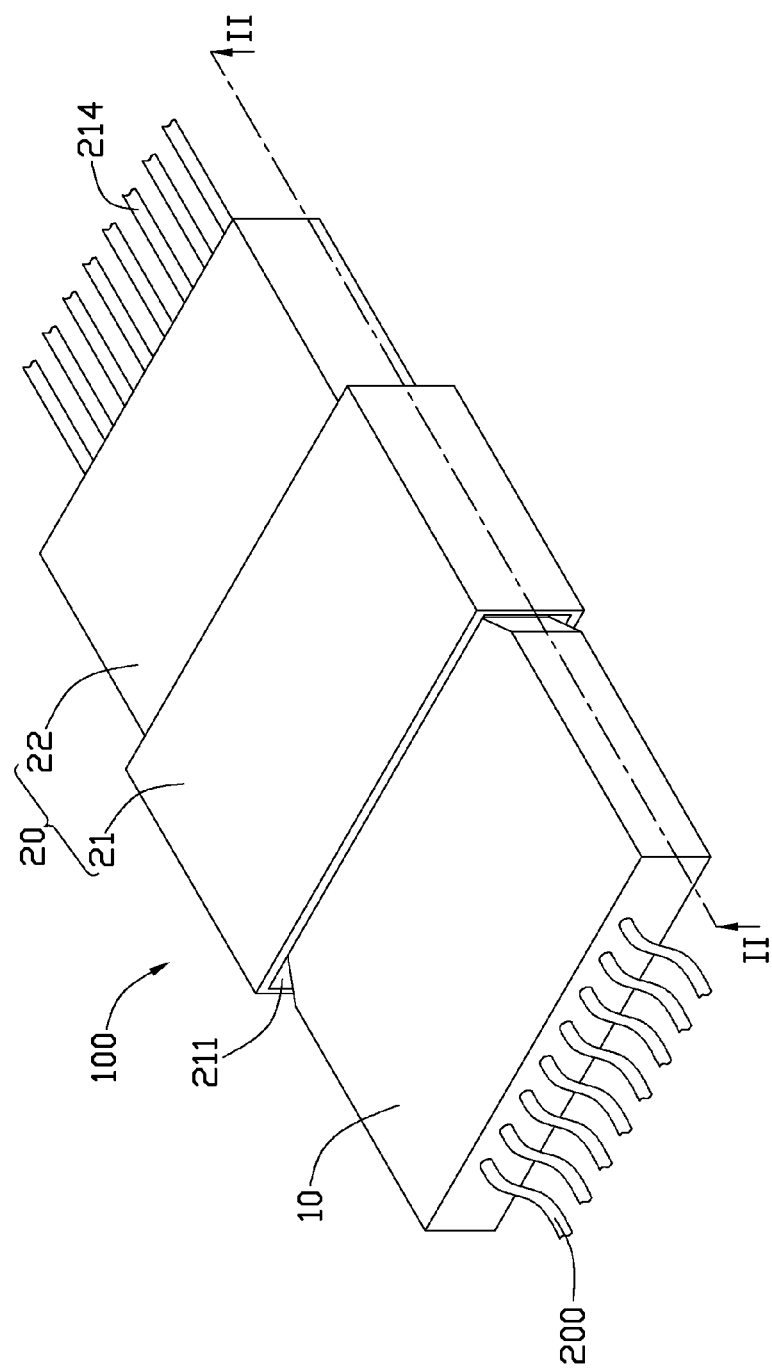
FIG. 1 is an isometric and schematic view of an optical fiber connector assembly, according to a first exemplary embodiment.
Figure 2:
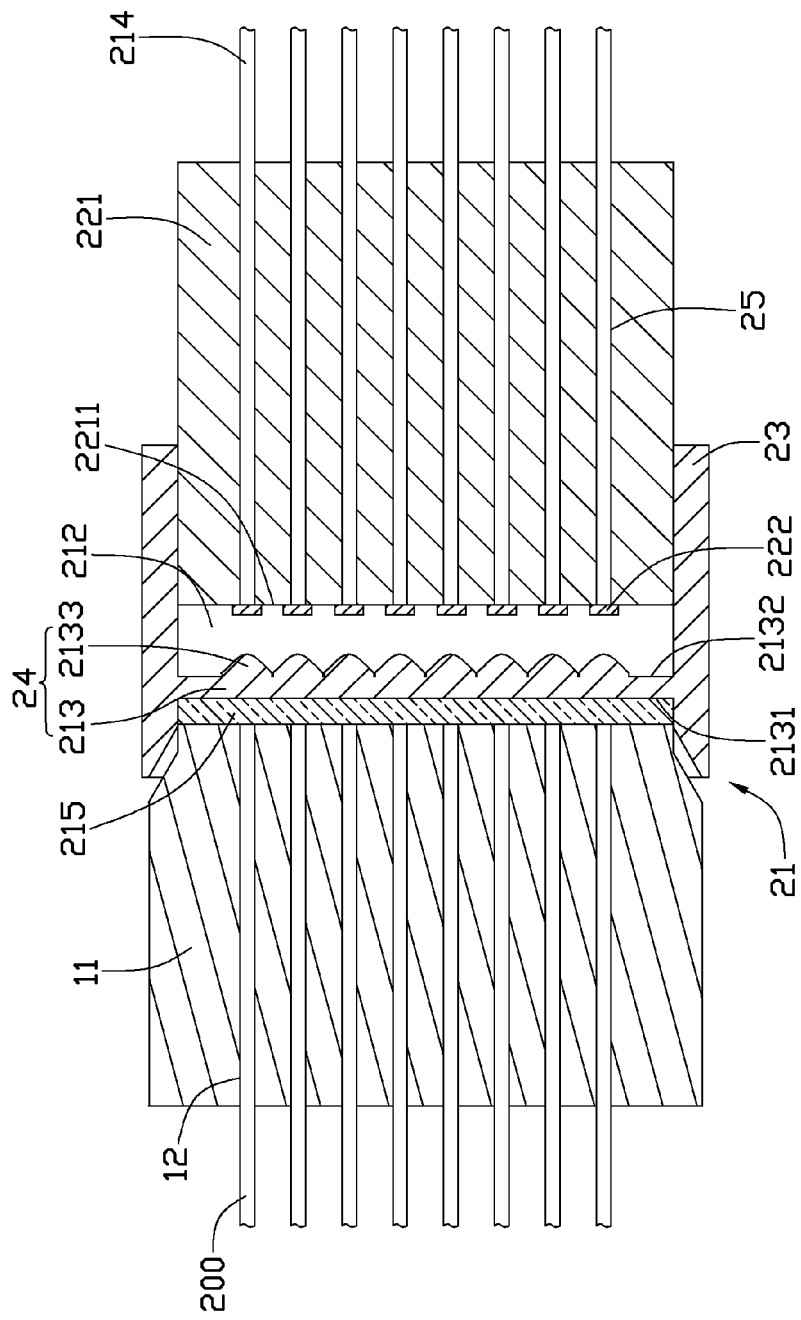
FIG. 2 is a sectional view taken along line II-II of the optical fiber connector assembly of FIG. 1.

Referring to FIGS. 1 and 2, an optical fiber connector assembly 100, according to a first exemplary embodiment, includes a first connector 10, a plurality of optical fibers 200, a second connector 20, and a plurality of electric wires 214. In this embodiment, the first connector 10 is a plug, and the second connector 20 is a socket. The first connector 10 is mechanically engaged with the second connector 20 when the optical fiber connector assembly 100 is in a coupled state.

The first connector 10 includes a first body 11 and a plurality of first through holes 12. The first body 11 is substantially cuboid. The first through holes 12 are defined through the first body 11. The first through holes 12 are substantially parallel to each other. The first though hole 12 receives an optical fiber 200. Therefore, the optical fibers 200 are parallel to each other in the first through holes 12.

The second connector 20 includes a coupling portion 21 and a conversion portion 22.

The coupling portion 21 includes a coupling sleeve 23, a soft optical film 215, and an optical portion 24. The coupling sleeve 23 is substantially cuboid. The optical portion 24 is fixed to an inner wall of the coupling sleeve 23. Thereby, a first receiving recess 211 and a second receiving recess 212 are formed at opposite sides of the coupling sleeve 23. In this embodiment, the optical portion 24 is integrally formed with the coupling sleeve 23.

The optical portion 24 includes a supporting plate 213 and a plurality of lenses 2133. The supporting plate 213 includes a first surface 2131 and a second surface 2132 at opposite sides of the supporting plate 213. The soft optical film 215, such as a resin film having a high refractivity, is attached to the first surface 2131 in the first receiving recess 211. The lenses 2133 are formed on the second surface 2132, and each lens 2133 is aspherical and convex and is aligned with a corresponding optical fiber 200. When in use, the first connector 10 is inserted into the first receiving recess 211 with the first body 11 abutting against the soft optical film 215. Any air gap between the first connector 10 and the second connector 20 can be eliminated, and loss of optical signals can be minimized.

The conversion portion 22 includes a second body 221 and a plurality of light detectors 222. The second body 221 is substantially cuboid. A plurality of parallel second through holes 25 are defined through the second body 221. Each second through hole 25 is aligned with a first through hole 12 and receives an electric wire 214. The light detectors 222 are attached to a surface 2211 of the second body 221 facing the lenses 2133 in the second recess 212. A position of each light detector 222 is at a focal point of the corresponding lens 2133. The lens 2133 focuses light from the corresponding optical fiber 200 onto the light detector 222. Therefore, loss of optical signals can be minimized. The light detectors 222 are configured for receiving the optical signals from the lenses 2133 and converting the optical signals into electrical signals. Each light detector 222 is electrically connected to a corresponding electric wire 214. The electrical signals converted by the light detectors 222 can be transmitted by the electric wires 214.

Since the optical signals from the first connector 10 can be focused by the lenses 2133 in the second connector 20, alignment between the lenses in the first connector 10 and the lenses in the second connector 20 is not needed. Therefore, loss of optical signals can be minimized.

Figure 3:
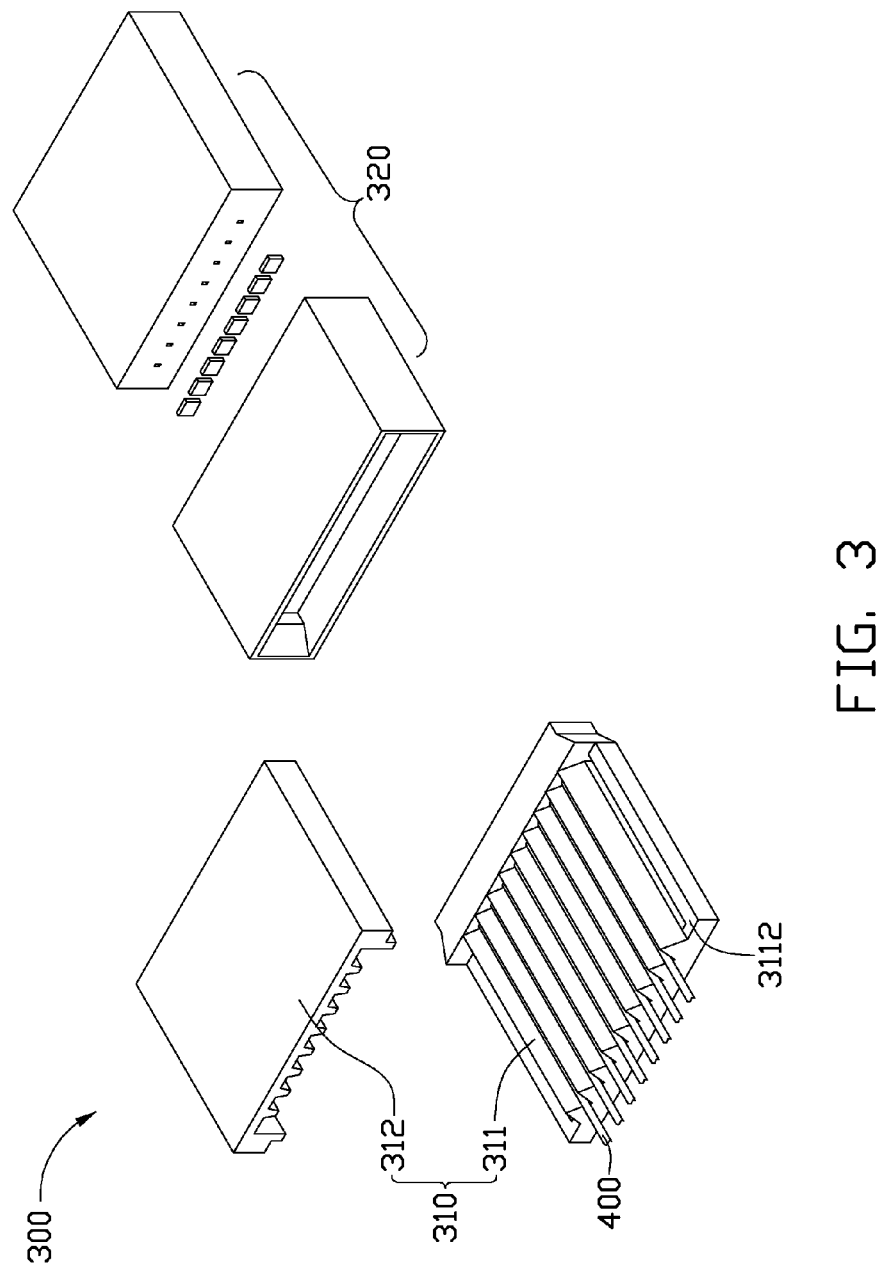
FIG. 3 is an exploded view of an optical fiber connector assembly including a first connector, according to a second exemplary embodiment.
Figure 4:
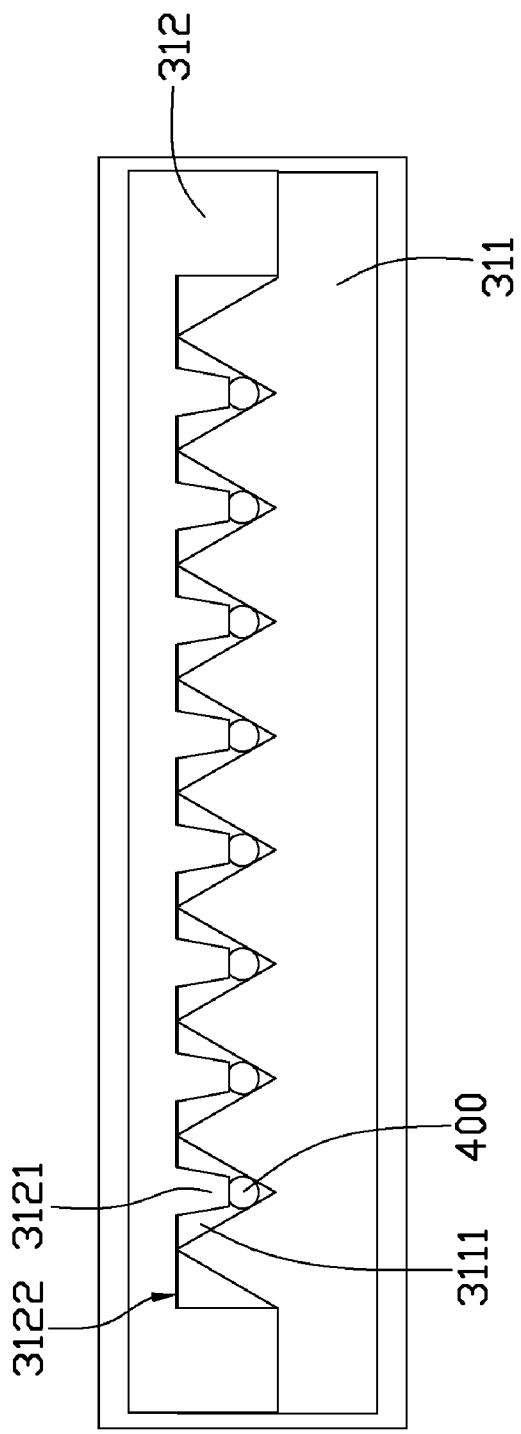
FIG. 4 is a planar view of the first connector of FIG. 3.

Referring to FIGS. 3 and 4, an optical fiber connector assembly 300, according to a second exemplary embodiment, is shown. The difference between the optical fiber connector assembly 300 of this embodiment and the optical fiber connector assembly 100 of the first embodiment is that a first connector 310 of the optical fiber connector assembly 300 differs from that of the optical fiber connector assembly 100. The first connector 310 is mechanically engaged with a second connector 320.

The first connector 310 includes a support 311 and a cover 312. A plurality of supporting grooves 3111 is defined in a surface 3112 of the support 311 facing the cover 312. Each supporting groove 3111 is V-shaped in this embodiment and supports a corresponding optical fiber 400 therein. The support 311 may be fixed to the cover 312 by glue.

A plurality of protruding strips 3121 protrude from a surface 3122 of the cover 312 facing the support 311. The protruding strips 3121 correspond to the respective supporting grooves 3111. When the cover 312 is engaged with the support 311, the protruding strips 3121 abut against the optical fibers 400. Therefore, the optical fibers 400 can be fixed/retained by the cooperation of the protruding strips 3121 and the supporting grooves 3111.

Advantages of the optical fiber connector assembly 300 of this embodiment are the same as those of the optical fiber connector assembly 100 of the first embodiment.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An optical fiber connector assembly, comprising:
   a plurality of optical fibers;
   a first connector receiving the optical fibers;
   a plurality of electric wires; and
   a second connector comprising a coupling portion and a conversion portion, the coupling portion comprising a coupling sleeve and an optical portion extending from an inner wall of the coupling sleeve, a first receiving recess and a second receiving recess formed in the coupling portion at opposite sides of the optical portion, the optical portion comprising a plurality of lenses facing toward the second receiving recess, the first connector engaged with the coupling sleeve and received in the first receiving recess, the lenses optically coupled to the respective optical fibers, the conversion portion receiving the electric wires and partially received in the second receiving recess, the conversion portion comprising a plurality of light detectors electrically connected to the corresponding electric wires and facing the lenses to receive and convert optical signals into electrical signals.

2. The optical fiber connector assembly of claim 1, wherein the first connector comprises a first body and a plurality of parallel first through holes defined through the first body, the first body mechanically engaged with the coupling portion, the optical fibers being received in the respective first through holes.

3. The optical fiber connector assembly of claim 2, wherein the optical portion further comprises a supporting plate, the supporting plate comprising a first surface and a second surface at opposite sides thereof, the lenses being formed on the second surface.

4. The optical fiber connector assembly of claim 3, further comprising a soft optical film being attached to the first surface and abutting against the first body in the first receiving recess, the soft optical film sandwiched between the first body and the optical portion.

5. The optical fiber connector assembly of claim 1, wherein the conversion portion further comprises a second body and a plurality of parallel second through holes defined through the second body, the light detectors being attached to a surface of the second body facing the lenses, the electric wires being received in the respective second through holes.

6. The optical fiber connector assembly of claim 1, wherein the first connector comprises a support, a cover, a plurality of supporting grooves and a plurality of protruding strips, the supporting grooves being defined in a surface of the support facing the cover, the protruding strips protruding from a surface of the cover facing the support, the support being fixed to the cover, the optical fibers being fixedly received in the supporting grooves with the protruding strips abutting against the respective optical fibers.

7. An optical fiber connector assembly, comprising:
   a first connector including a support including a plurality of V-shaped grooves, a cover attached to the support, and a plurality of protruding strips formed on the cover and inserted in the respective V-shaped grooves;
   a plurality of optical fibers sandwiched between the support and the protruding strips and retained in the respective V-shaped grooves;
   a plurality of electric wires; and
   a second connector comprising a coupling portion and a conversion portion, the coupling portion comprising a coupling sleeve and an optical portion extending from an inner wall of the coupling sleeve, a first receiving recess and a second receiving recess formed in the coupling portion at opposite sides of the optical portion, the optical portion comprising a plurality of lenses facing toward the second receiving recess, the first connector engaged with the coupling sleeve and received in the first receiving recess, the lenses optically coupled to the respective optical fibers, the conversion portion receiving the electric wires and partially received in the second receiving recess, the conversion portion comprising a plurality of light detectors optically aligned with the lenses and electrically connected to the corresponding electric wires.

8. The optical fiber connector assembly of claim 1, wherein the optical portion is integrally formed with the coupling sleeve.

9. The optical fiber connector assembly of claim 4, wherein the soft optical film is made of high refractivity resin film.

10. The optical fiber connector assembly of claim 1, wherein a position of each light detector is at a focal point of the corresponding lens.

11. The optical fiber connector assembly of claim 7, wherein the optical portion further comprises a supporting plate, the supporting plate comprising a first surface and a second surface at opposite sides thereof, the lenses being formed on the second surface.

12. The optical fiber connector assembly of claim 11, further comprising a soft optical film being attached to the first surface and abutting against the first connector in the first receiving recess, the soft optical film sandwiched between the first connector and the optical portion.

* * * * *